United States Patent
Lyu et al.

(10) Patent No.: US 12,471,141 B2
(45) Date of Patent: Nov. 11, 2025

(54) METHOD AND APPARATUS FOR COMMUNICATION

(71) Applicant: QUECTEL WIRELESS SOLUTIONS CO., LTD., Shanghai (CN)

(72) Inventors: Ling Lyu, Shanghai (CN); Zheng Zhao, Shanghai (CN); Zhongzhi Yang, Shanghai (CN)

(73) Assignee: Quectel Wireless Solutions Co., Ltd., Shanghai (CN)

( * ) Notice: Subject to any disclaimer, the term of this patent is extended or adjusted under 35 U.S.C. 154(b) by 0 days.

(21) Appl. No.: 18/617,502

(22) Filed: Mar. 26, 2024

(65) Prior Publication Data

US 2024/0244661 A1    Jul. 18, 2024

Related U.S. Application Data

(63) Continuation of application No. PCT/CN2023/082085, filed on Mar. 17, 2023.

(30) Foreign Application Priority Data

Dec. 7, 2022  (CN) .......................... 202211581071.6

(51) Int. Cl.
  *H04W 74/0808*  (2024.01)
  *H04W 92/18*   (2009.01)
(52) U.S. Cl.
  CPC ........ *H04W 74/0808* (2013.01); *H04W 92/18* (2013.01)
(58) Field of Classification Search
  CPC ................................................. H04W 74/0808
  See application file for complete search history.

(56) References Cited

U.S. PATENT DOCUMENTS

| 2022/0078845 A1 | 3/2022 | Xu et al. |
| 2023/0035989 A1* | 2/2023 | Awadin ............... H04W 72/569 |

(Continued)

FOREIGN PATENT DOCUMENTS

| CN | 103259739 | 8/2013 |
| CN | 103906174 A | 7/2014 |

(Continued)

OTHER PUBLICATIONS

International Search Report and Written Opinion in International Appln. No. PCT/CN2023/082085, mailed on Aug. 9, 2023, 15 pages (with English machine translation).

(Continued)

*Primary Examiner* — Kevin M Cunningham
(74) *Attorney, Agent, or Firm* — Fish & Richardson P.C.

(57) ABSTRACT

Disclosed are a method and an apparatus for communication. One example method includes receiving, by a first terminal device from a second terminal device, a request for allocating resources in a channel occupancy time (COT) shared resource; determining, by the first terminal device based on a service type of the COT shared resource, a first resource allocated to the second terminal device in the COT shared resource; and wherein the first resource belongs to a first resource block, the first resource block is one of K resource blocks in the COT shared resource, and a priority corresponding to each of the K resource blocks is the same as or higher than a priority corresponding to the service type.

20 Claims, 5 Drawing Sheets

Determining, by a first terminal device based on a service type for which a COT shared resource is requested by a second terminal device, a first resource allocated to the second terminal device in the COT shared resource  ～S510

(56) References Cited

U.S. PATENT DOCUMENTS

| | | | |
|---|---|---|---|
| 2023/0142670 A1* | 5/2023 | Mohammad Soleymani | ............... H04W 72/02 370/329 |
| 2023/0148141 A1* | 5/2023 | Hu | .................... H04W 74/0808 370/329 |
| 2023/0309119 A1* | 9/2023 | Mohammad Soleymani | ............... H04W 72/25 |
| 2024/0121825 A1* | 4/2024 | Rastegardoost | .. H04W 74/0816 |

FOREIGN PATENT DOCUMENTS

| | | |
|---|---|---|
| CN | 111565475 A | 8/2020 |
| CN | 114467314 | 5/2022 |
| CN | 114731706 A | 7/2022 |

OTHER PUBLICATIONS

Office Action in Chinese Appln. No. 202211581071.6, mailed on Jun. 17, 2025, 25 pages (with machine translation).

* cited by examiner

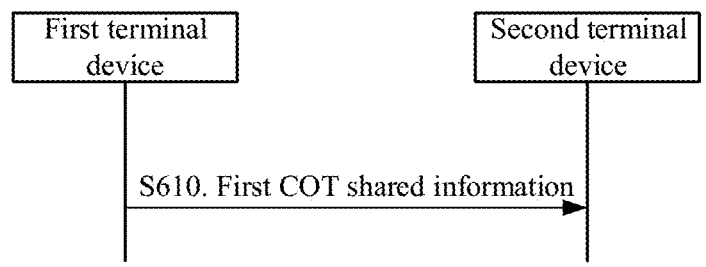
FIG. 5
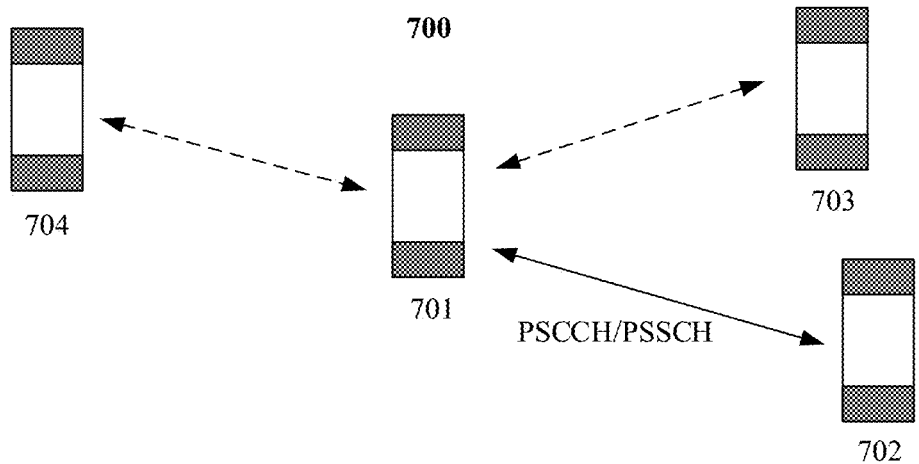
FIG. 6
FIG. 7

METHOD AND APPARATUS FOR COMMUNICATION

CROSS-REFERENCE TO RELATED APPLICATIONS

The present application is a continuation of PCT Patent Application No. PCT/CN2023/082085, filed on Mar. 17, 2023, which claims priority to Chinese Patent Application No. 202211581071.6, filed on Dec. 7, 2022. All of the aforementioned applications are incorporated herein by reference in their entireties.

TECHNICAL FIELD

This application relates to the field of communications technologies, and more specifically, to a method and an apparatus for communication.

BACKGROUND

In unlicensed spectrum, a sidelink terminal device obtains a channel resource through a mechanism such as listen before talk (LBT). The terminal device may use the channel resource to perform sidelink communication within a channel occupancy time (COT), or may perform COT sharing with another terminal device.

Resources used for sharing in a COT are limited. When COT shared resources are requested for a plurality of different types of services, how the terminal device performs resource allocation to improve resource utilization is a problem that needs to be solved.

SUMMARY

The present application provides a method and an apparatus for communication. Various aspects of the embodiments of the present application are described below.

According to a first aspect, a method for communication is provided, and the method includes: determining, by a first terminal device based on a service type for which a COT shared resource is requested by a second terminal device, a first resource allocated to the second terminal device in the COT shared resource, where the first resource belongs to a first resource block, the first resource block is one of K resource blocks in the COT shared resource, and the K resource blocks are in a one-to-one correspondence with K service types.

According to a second aspect, an apparatus for communication is provided, where the apparatus is a first terminal device, and the first terminal device includes: a determining unit, configured to determine, based on a service type for which a COT shared resource is requested by a second terminal device, a first resource allocated to the second terminal device in the COT shared resource, where the first resource belongs to a first resource block, the first resource block is one of K resource blocks in the COT shared resource, and the K resource blocks are in a one-to-one correspondence with K service types.

According to a third aspect, a communications apparatus is provided and includes a memory and a processor, where the memory is configured to store a program, and the processor is configured to invoke the program in the memory to perform the method according to the first aspect.

According to a fourth aspect, an apparatus is provided, and the apparatus includes a processor configured to invoke a program from a memory to perform the method according to the first aspect.

According to a fifth aspect, a chip is provided, and the chip includes a processor configured to invoke a program from a memory to cause a device installed with the chip to perform the method according to the first aspect.

According to a sixth aspect, a computer-readable storage medium is provided, and the computer-readable storage medium stores a program that causes a computer to perform the method according to the first aspect.

According to a seventh aspect, a computer program product is provided, and the computer program product includes a program that causes a computer to perform the method according to the first aspect.

According to an eighth aspect, a computer program is provided, where the computer program causes a computer to perform the method according to the first aspect.

In embodiments of the present application, COT shared resources are managed in blocks based on service types, and a first terminal device allocates a first resource based on a service type for which a COT shared resource is requested. It may be learned that the COT shared resource includes K resource blocks corresponding to K service types. When other terminal devices request resources based on different service types, a COT may meet resource requirements of the different service types, thereby improving resource utilization and reducing resource collisions.

BRIEF DESCRIPTION OF THE DRAWINGS

FIG. 5 is a schematic flowchart of a method for communication according to an embodiment of the present application.

FIG. 6 is a schematic flowchart of another method for communication according to an embodiment of the present application.

FIG. 7 is an example diagram of a unicast communications system to which embodiments of the present application are applicable.

DETAILED DESCRIPTION OF THE EMBODIMENTS

The following clearly and completely describes the technical solutions in the embodiments of the present application with reference to the accompanying drawings. Apparently, the described embodiments are only some rather than all of the embodiments of the present application. For ease of understanding, the terms and communication processes involved in the present application are first described below with reference to FIG. 1 to FIG. 5.

Figure 1:
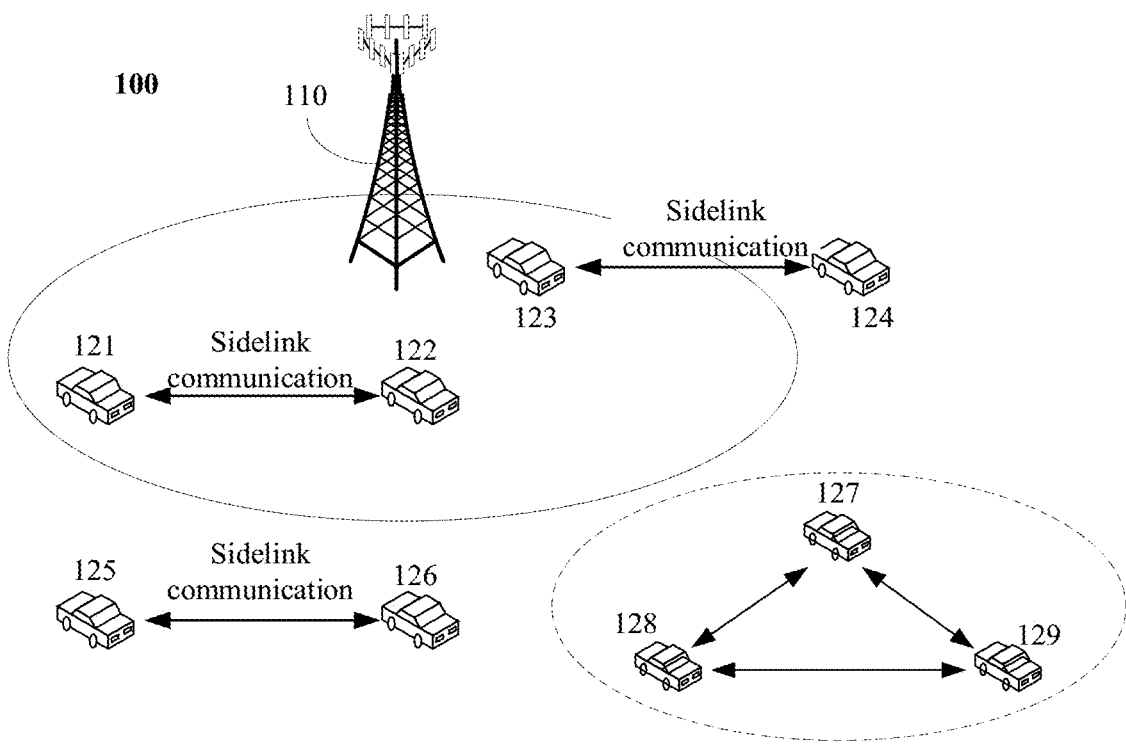
FIG. 1 is an example diagram of a wireless communications system to which embodiments of the present application are applicable.

FIG. 1 is an example diagram of a system architecture of a wireless communications system 100 to which the embodiments of the present application are applicable. The wireless communications system 100 may include a network device 110 and terminal devices 121 to 129. The network device 110 may provide communication coverage for a specific geographic area, and may communicate with terminals within the coverage area.

In some implementations, terminal devices may communicate with each other through a sidelink (SL). The sidelink communication may also be referred to as proximity services (ProSe) communication, unilateral communication, side link communication, device-to-device (D2D) communication, or the like.

In other words, sidelink data is transmitted between terminal devices over a sidelink. The sidelink data may include data and/or control signaling. In some implementations, the sidelink data may be a physical sidelink control channel (PSCCH), a physical sidelink shared channel (PSSCH), a PSCCH demodulation reference signal (DMRS), a PSSCH DMRS, a physical sidelink feedback channel (PSFCH), or the like.

Several common sidelink communication scenarios are described below with reference to FIG. 1. Sidelink communication may include three scenarios depending on whether the terminal devices in the sidelink are within the coverage of the network device. In scenario 1, the terminal devices perform sidelink communication within the coverage of the network device. In scenario 2, some of the terminal devices perform sidelink communication within the coverage of the network device. In scenario 3, the terminal devices perform sidelink communication outside the coverage of the network device.

As shown in FIG. 1, in scenario 1, terminal devices 121 and 122 may communicate with each other over a sidelink, and the terminal devices 121 and 122 are both within the coverage of the network device 110, or in other words, the terminal devices 121 and 122 are both within the coverage of the same network device 110. In this scenario, the network device 110 may send configuration signaling to the terminal devices 121 and 122, and accordingly, the terminal devices 121 and 122 communicate with each other over the sidelink based on the configuration signaling.

As shown in FIG. 1, in scenario 2, terminal devices 123 and 124 may communicate with each other over a sidelink, and the terminal device 123 is within the coverage of the network device 110, while the terminal device 124 is outside the coverage of the network device 110. In this scenario, the terminal device 123 receives configuration information from the network device 110, and communicates over the sidelink based on a configuration of the configuration signaling. However, since the terminal device 124 is outside the coverage of the network device 110, the terminal device 124 cannot receive the configuration information from the network device 110. In this case, the terminal device 124 may obtain a configuration of the sidelink communication based on pre-configured configuration information and/or the configuration information sent by the terminal device 123 within the coverage, so as to communicate with the terminal device 123 over the sidelink based on the obtained configuration.

In some cases, the terminal device 123 may send the configuration information to the terminal device 124 through a physical sidelink broadcast channel (PSBCH), so as to configure the terminal device 124 to communicate over the sidelink.

As shown in FIG. 1, in scenario 3, terminal devices 125 to 129 are all outside the coverage of the network device 110 and cannot communicate with the network device 110. In this case, all the terminal devices may perform sidelink communication based on pre-configuration information.

In some cases, the terminal devices 127 to 129 outside the coverage of the network device may form a communication cluster, and the terminal devices 127 to 129 in the communication cluster may communicate with each other. In addition, the terminal device 127 in the communication cluster may serve as a central control node, also referred to as a cluster header (CH). Correspondingly, the other terminal devices in the communication cluster may be referred to as "cluster members".

The terminal device 127 as the CH may have one or more of the following functions: responsible for establishment of the communication cluster; joining and leaving of the cluster members; resource coordination, allocation of sidelink transmission resources for the cluster members, and reception of sidelink feedback information from the cluster members; resource coordination with another communication cluster; and other functions.

It should be noted that FIG. 1 exemplarily shows a network device and a plurality of terminal devices. Optionally, the wireless communications system 100 may include a plurality of network devices, and another number of terminal devices may be included in the coverage of each network device, which is not limited in embodiments of the present application.

Optionally, the wireless communications system 100 may further include other network entities such as a network controller and a mobility management entity, which is not limited in the embodiments of the present application.

It should be understood that the technical solutions in the embodiments of the present application may be applied to various communications systems, for example, a 5th generation (5G) system or new radio (NR) system, a long term evolution (LTE) system, an LTE frequency division duplex (FDD) system, and an LTE time division duplex (TDD). The technical solutions provided in the present application may also be applied to future communications systems, such as a 6th generation mobile communications system and a satellite communications system.

The terminal device in the embodiments of the present application may also be referred to as user equipment (UE), an access terminal, a subscriber unit, a subscriber station, a mobile site, a mobile station (MS), a mobile terminal (MT), a remote station, a remote terminal, a mobile device, a user terminal, a wireless communications device, a user agent, or a user apparatus. The terminal device in the embodiments of the present application may be a device providing a user with voice and/or data connectivity and capable of connecting people, objects, and machines, such as a handheld device, vehicle-mounted, or the like device having a wireless connection function. The terminal device in the embodiments of the present application may be a mobile phone, a tablet computer (Pad), a notebook computer, a palmtop computer, a mobile internet device (MID), a wearable device, a vehicle, a wireless terminal in industrial control, a wireless terminal in self driving, a wireless terminal in remote medical surgery, a wireless terminal in a smart grid, a wireless terminal in transportation safety, a wireless terminal in smart city, a wireless terminal in smart home, or the like. Optionally, the terminal device may be used to act as a base station. For example, the terminal device may act as a scheduling entity, which provides a sidelink signal between terminal devices in vehicle-to-everything (V2X) or D2D, or the like. For example, a cellular phone and a car communicate with each other using sidelink data. A cellular phone and a smart home device communicate with each other, without the relay of a communication signal through a base station.

The network device in the embodiments of the present application may be a device for communicating with the terminal device. The network device may also be referred to as an access network device or a wireless access network device. For example, the network device may be a base station. The network device in the embodiments of the present application may be a radio access network (RAN) node (or device) that connects the terminal device to a wireless network. The base station may broadly cover various names in the following, or may be interchangeable with one of the following names, for example: a NodeB, an evolved NodeB (eNB), a next generation NodeB (gNB), a relay station, a transmitting and receiving point (TRP), a transmitting point (TP), an access point (AP), a master eNB (MeNB), a secondary eNB (SeNB), a multi-standard radio (MSR) node, a home base station, a network controller, an access node, a radio node, a transmission node, a transceiver node, a base band unit (BBU), a remote radio unit (RRU), an active antenna unit (AAU), a remote radio head (RRH), a central unit (CU), a distributed unit (DU), and a positioning node, or the like. The base station may be a macro base station, a micro base station, a relay node, a donor node, or the like, or a combination thereof. Alternatively, the base station may be a communications module, a modem, or a chip disposed in the device or apparatus described above. Alternatively, the base station may be a mobile switching center, a device that assumes the function of a base station in D2D, V2X, and machine-to-machine (M2M) communications, a network-side device in a 6G network, a device that assumes the function of a base station in a future communications system, or the like. The base station may support networks of the same or different access technologies. A specific technology and specific device form used by the network device are not limited in the embodiments of the present application.

The base station may be fixed or mobile. For example, a helicopter or an unmanned aerial vehicle may be configured to act as a mobile base station, and one or more cells may move according to the position of the mobile base station. In other examples, a helicopter or an unmanned aerial vehicle may be configured to serve as a device in communication with another base station.

In some deployments, the network device in the embodiments of the present application may be a CU or a DU, or the network device includes a CU and a DU. The gNB may further include an AAU.

The network device and the terminal device may be deployed on land, including indoor or outdoor, handheld or vehicle-mounted; or may be deployed on water; or may be deployed on an airplane, a balloon, and a satellite in the air. In the embodiments of the present application, a scenario where the network device and the terminal device are located is not limited.

It should be understood that all or some of the functions of the communications device in the present application may also be implemented by software functions running on hardware, or by virtualization functions instantiated on a platform (such as a cloud platform).

Communication Mode for Sidelink

Figure 2:
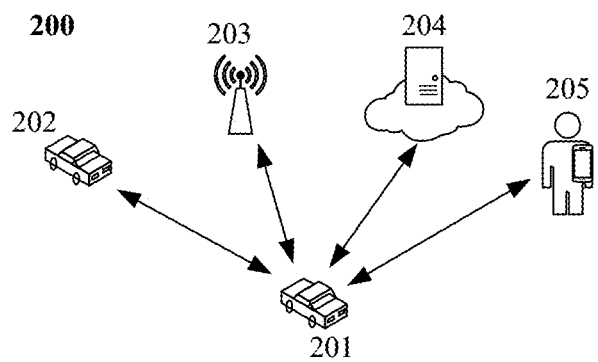
FIG. 2 is an example diagram of communication of NR-V2X.

With the development of sidelink communications technologies, the sidelink communications technologies relate to information exchange between various terminal devices. A V2X communications system 200 shown in FIG. 2 is used as an example, in which vehicle-to-vehicle (V2V) communication between a terminal device 201 and a terminal device 202 relates to information exchange between the vehicles themselves. Vehicle-to-infrastructure (V2I) communication, vehicle-to-network (V2N) communication, and vehicle-to-pedestrian (V2P) communication respectively between the terminal device 201 and terminal devices 203 to 205 relate to information exchange between the vehicles and an external system.

The gradual expansion of the information exchange range imposes higher requirements on the communications system. For example, the communications system is required to support higher throughput, lower latency, higher reliability, larger coverage, more flexible resource allocation, and the like. The development of V2X is used as an example. In LTE-V2X, only a broadcast mode is supported between terminal devices for sidelink communication. In NR-V2X, three communication modes, namely, broadcast, groupcast, and unicast, may be supported.

Broadcast is the most basic communication mode in sidelink communication. For the transmission mode of broadcast, sidelink data may be received by any terminal device around a terminal device as a transmitter end. For example, referring to FIG. 1, assuming that the terminal device 125 sends sidelink data in a broadcast mode as a transmitting end, any of the terminal devices 121 to 124 and the terminal devices 126 to 129 around the terminal device 125 may be used as a receiving end of the sidelink data.

Groupcast (multicast) communication is used to support information exchange between terminal devices in a specific group (or referred to as a communication cluster), so as to assist in the negotiation and decision-making between terminal devices in the group. Sidelink groupcast has two transmission types. Type 1 is for a managed group with a stable connection relationship, which has clear ID information and cluster member information. Type 2 is for a connectionless group formed in a connectionless manner, for example, is a distance-based dynamically formed groupcast, which requires a communication distance of the current service to be definitely indicated.

For the transmission mode of groupcast, sidelink data may be received by all terminal devices in a communication cluster. Alternatively, the sidelink data may be received by all terminal devices within a specific transmission distance. For example, referring to FIG. 1, for a communication cluster including the terminal devices 127 to 129, when the terminal device 127 sends sidelink data in a groupcast mode, all the other terminal devices 128 and 129 in the communication cluster are terminal devices that receive the sidelink data. For another example, referring to FIG. 1, assuming that terminal devices within a preset range include the terminal devices 127 to 129, when the terminal device 127 sends sidelink data in a groupcast manner, all the other terminal devices 128 and 129 within the preset range are terminal devices that receive the sidelink data.

Unicast communication may enable sidelink communication between two terminal devices. NR-V2X is used as an example, in which reliable communication between one terminal device and another may be implemented based on radio resource control (RRC) signaling of a PC5 interface.

For the transmission mode of unicast, there is usually only one terminal device that receives sidelink data. Referring to FIG. 1, the terminal device 121 and the terminal device 122 may communicate in the transmission mode of unicast. For example, when the terminal device 121 performs sidelink communication with the terminal device 122, the terminal device 122 receives sidelink data as a unique receiving device. The sidelink data may include a PSSCH and a PSCCH. Through demodulation, the terminal device 122 may obtain sidelink control information (SCI) related to sidelink transmission and scheduling. The SCI may help the terminal device 122 to receive and decode sidelink information.

In a communications system, a higher layer determines whether unicast, groupcast, or broadcast transmission is used for a specific data transmission, and correspondingly notifies a physical layer. For example, when considering unicast or groupcast transmission, a terminal device can determine a unicast or groupcast session to which the transmission belongs, and known identity (ID) information at the physical layer. An ID of a destination transmitted in the SCI is transmitted by using the PSCCH, and may be used by the receiving end to identify a process ID for transmitting hybrid automatic repeat request (HARQ) when HARQ feedback is used. An access stratum may notify that whether the specific data transmission is unicast, groupcast or broadcast transmission. For unicast transmission and groupcast transmission in an SL, known ID information at layer 2 includes a destination ID and a source ID of the unicast transmission; and an ID of a destination group and a source ID of the groupcast transmission. If the ID of the destination group is configured for the terminal device, broadcast transmission is allowed for the destination group, regardless of whether the terminal device is within or outside a "minimum communication range" provided by an upper layer.

In some communications systems (for example, NR-V2X), a problem of HARQ transmission in a resource pool needs to be solved. For example, groupcast and unicast sidelink transmission supported by the NR V2X supports HARQ operations. The unicast and groupcast services of the SL support a HARQ mechanism through acknowledgement (ACK)/negative acknowledgement (NACK). For groupcast services, NACK-only HARQ may also be used. In addition, a blind retransmission mechanism is further supported. A sidelink HARQ feedback is sent by a terminal device at the receiving end to a terminal device at the transmitting end on a PSFCH. A HARQ feedback resource may be configured and/or preconfigured in a resource pool of a sidelink, for example, which is periodically performed every n slot (n=1, 2, or 4). In other words, NR V2X may support resource reservation based on HARQ retransmission.

Resource Pool for Sidelink

In some communications systems (for example, NR), two resource configuration modes for sidelink resources are defined, namely, mode 1 and mode 2. In mode 1, a network device schedules a sidelink resource for a terminal device. For example, in FIG. 1, the terminal devices 121 to 123 are within the coverage of the network device 110, and the network device 110 may allocate sidelink resources for the terminal devices 121 to 123.

In mode 2, the terminal device independently selects a sidelink resource in a resource pool. In this mode, a process performed by the terminal device includes a resource probing process and/or a resource selection process. In the resource probing process, the terminal device may detect the occupancy of the sidelink resources by demodulating SCI. Alternatively, the terminal device may detect the occupancy of the sidelink resources by measuring a received power of the sidelink. For example, the terminal devices 124 to 129 in FIG. 1 are outside the coverage of the network device 110, and the terminal devices 124 to 129 each may independently select a sidelink resource in mode 2.

Figure 3:
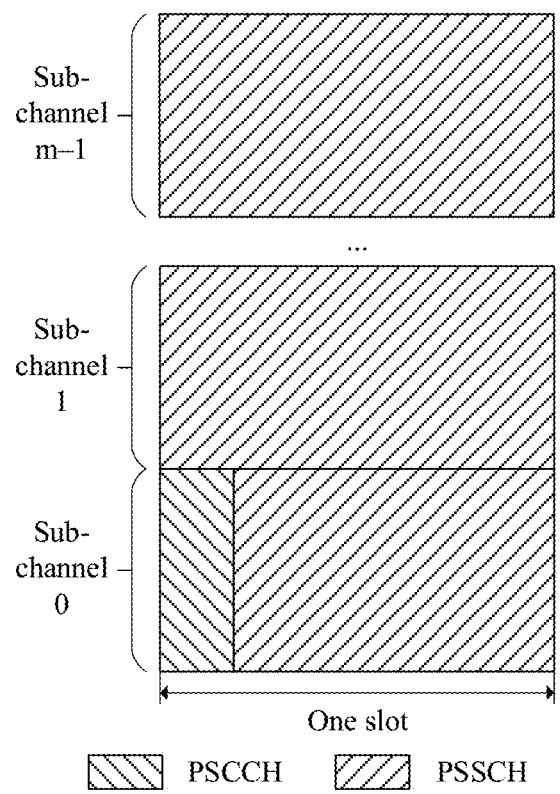
FIG. 3 is a schematic structural diagram of a single slot of a sidelink resource pool.

A sidelink resource pool to which the embodiments of the present application are applicable is described below by taking an NR-V2X resource pool as an example with reference to FIG. 3. A sub-channel may be understood as the minimum granularity of PSSCH resource allocation specified in NR-V2X. As shown in FIG. 3, the sidelink resource pool includes m sub-channels, namely, a sub-channel 0, a sub-channel 1, . . . , and a sub-channel m−1. Each sub-channel may consist of $n_{SubCHsize}$ physical resource blocks (PRBs), where the value of $n_{SubCHsize}$ is 10, 12, 15, 20, 25, 50, 75, or 100. In time domain, a terminal device may be configured with $m \times n_{SubCHsize}$ PRBs at a specific slot, and the $m \times n_{SubCHsize}$ PRBs can be used for one transmission. If the resource pool includes T slots, the resource pool from which the terminal device may independently select is $m \times n_{SubCHsize} \times T$ PRBs.

Unicast communication between a terminal device A and a terminal device B is used as an example. In the resource pool, the terminal device A as a transmitting end may sequentially select resources for sidelink communication with the terminal device B at a receiving end. For example, the terminal device A may directly perform sidelink communication with the terminal device B on a part of frequency resources in a same slot, or in the next slot. Alternatively, the terminal device A may select a part of resources in each sub-channel of each slot for sidelink communication with the terminal device B.

Resource pools mainly include a reserved resource pool and a dynamically allocated resource pool. The reserved resource pool may be used in a plurality of communications systems. An NR resource pool is used as an example. The reserved resource pool is further adapted to access in another communications mode, for example, LTE, wireless fidelity (Wi-Fi), or the like. The reserved resource pool may be further used for a service having obvious periodic characteristics. For example, for V2X services such as road safety that have obvious periodic characteristics, a resource allocation mechanism that combines a perceived channel with semi-persistent scheduling (SPS) is used. This makes full use of the periodic characteristics of the V2X services. A transmitter node reserves periodic transmission resources to carry the periodic V2X services to be transmitted, which helps a receiving node perform resource status sensing and collision avoidance, thereby improving resource utilization and transmission reliability.

The dynamically allocated resource pool may be used for a non-periodic service. For the non-periodic service, a resource allocation mechanism combining sensing and single transmission is used. However, since it is impossible to predict and reserve future resource occupancy, there is a relatively high probability of resource collision.

Communications Spectrum for Sidelink

The spectrum used by communications systems includes licensed spectrum and unlicensed spectrum. An important direction for expansion of the communications systems to different fields is the use of unlicensed spectrum. For example, NR deployed on unlicensed spectrum is referred to as NR-U.

Currently, a sidelink mainly uses licensed spectrum. The sidelink may also use unlicensed spectrum. A sidelink deployed on unlicensed spectrum may be referred to as SL-U.

Compared with the licensed spectrum, the unlicensed spectrum has the feature of sharing without license. For operators, spectrum sharing facilitates spectrum aggregation in a timely manner to dynamically support high-bandwidth services. Spectrum sharing can also extend the benefits of communications technologies (such as NR) to an operating entity that may not have access to the licensed spectrum.

The unlicensed spectrum needs to consider the coexistence of different radio access technology (RAT) systems, for example, typically a Wi-Fi system and an LTE-based license assisted access (LAA) system. Different systems use frequency bands in the unlicensed spectrum in a spectrum contention manner according to the principles of channel access fairness and multi-RAT coexistence.

In the unlicensed spectrum, any RAT system needs to perform communication under the restrictions of the unlicensed spectrum regulatory rules. The regulatory rules include power and power spectral density levels, maximum COT, channel occupancy bandwidth, channel monitoring mechanisms, and the like. In a same frequency band, each system needs to meet the requirements of the regulatory rules, and reasonably occupy and release channels, so as not to cause interference to another RAT system in the same frequency band. For example, in order to support different RATs in the unlicensed spectrum, communication between sidelink terminal devices is subject to the foregoing regulatory rules.

For the use of the unlicensed spectrum, the RAT system may employ a mandatory channel monitoring technology (for example, LBT) to access a network. In other words, data can be transmitted only when it is detected that the current channel is not occupied. For example, a sidelink terminal device may initiate LBT, and the LBT may be Category 2 (Cat 2) LBT or Category 4 (Cat 4) LBT.

In an LBT channel access mechanism in SL-U, the unlicensed spectrum may support LBT in different types and levels depending on different cases. For example, LBT has different priorities that are used to reflect importance of a channel/signal to be transmitted. Generally, when requesting a COT resource, the terminal device uses the Cat 4 LBT. When data is transmitted, an LBT priority is determined based on transmitted data, and transmission of another signal/channel uses the highest priority.

After obtaining a channel resource through the LBT, the terminal device may perform corresponding detection, and transmit data based on the foregoing regulatory rules. For example, a COT limit needs to be satisfied when the terminal device transmits data over the channel resource. In other words, a continuous data transmission should be limited within a COT, and beyond this time, the terminal device needs to release the channel and perform LBT again.

The terminal device initiates the LBT and obtains a channel resource in the COT. Therefore, the terminal device is also referred to as an initiator of a COT resource. The following describes a resource status in a COT in detail with reference to FIG. 4.

Figure 4:
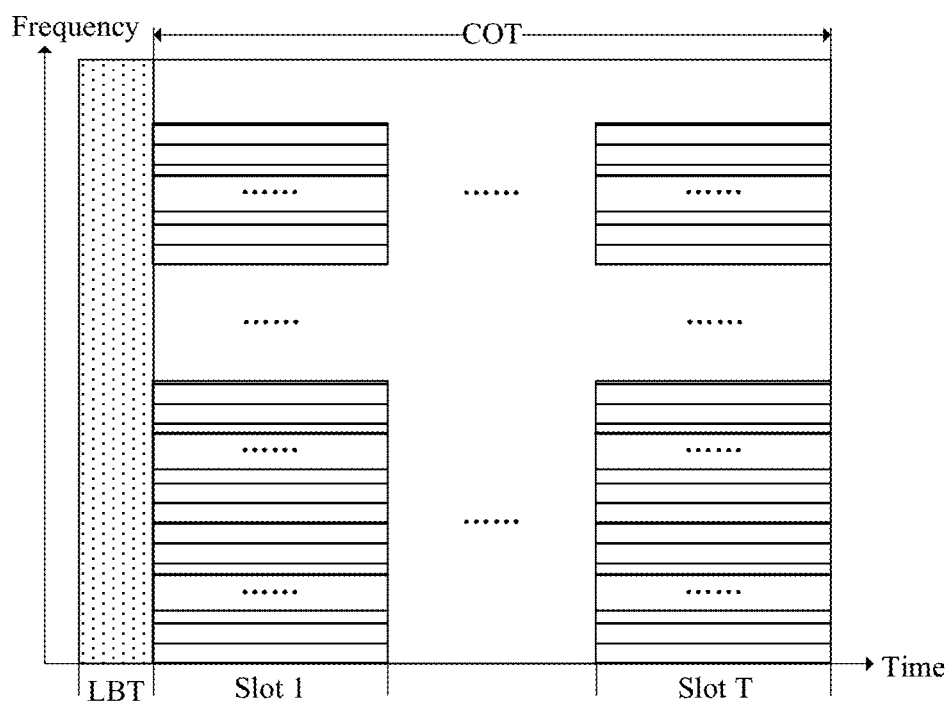
FIG. 4 is a schematic structural diagram of a COT resource obtained by a terminal device through LBT.

As shown in FIG. 4, a resource in a COT refers to a time-frequency resource in the COT after LBT. In frequency domain, the channel resource includes a plurality of sub-channels shown in FIG. 3. In time domain, the channel resource includes T slots in the COT. When there are m sub-channels, and each sub-channel includes $n_{SubCHsize}$ PRBs, a size of entire resource for COT sharing initiated by the terminal device is $m \times n_{SubCHsize} \times T$ PRBs. In a single slot, resources for COT sharing are $m \times n_{SubCHsize}$ PRBs.

After obtaining the COT resources shown in FIG. 4, the terminal device may perform sidelink transmission with another terminal device by sequentially selecting the resources. For example, the terminal device may transmit a PSSCH and a PSCCH by using some frequency resources in a same slot. The terminal device may further perform data transmission in different slots. The terminal device may further transmit the PSSCH and the PSCCH to another terminal device by selecting some resources on each sub-channel and in each slot.

In one COT shown in FIG. 4, a direction of data transmission can be changed. The terminal device that obtains COT information may send data to a terminal device at a receiving end of a sidelink by using a resource in the COT, and the terminal device at the receiving end may also transmit data to a terminal device at a transmitting end by using the resource. For example, after accessing a network by using LBT, a terminal device A can initiate COT sharing. If the terminal device A performs sidelink communication with a terminal device B, the PSSCH and the PSCCH are transmitted. The terminal device B may obtain transmission and scheduling information SCI related to the sidelink by demodulating the PSCCH. The terminal device B may receive and decode sidelink information by using the SCI.

Resources in the COT are used as a shared resource pool, and may also be divided into a reserved resource pool and a dynamically allocated resource pool. The reserved resource pool may be used for a periodic service, and the dynamically allocated resource pool is used to a resource request for a non-periodic service.

If the resources in the COT are not used up, remaining COT resources may further be shared with a terminal device of another sidelink, so as to avoid resource waste. For example, a terminal device C and a terminal device D may also perform sidelink communication by using COT shared information (COT-SI) sent by the terminal device A. Specifically, to provide sidelink sharing, the terminal device A may carry the COT shared information of the sidelink in the PSCCH. The COT shared information may indicate COT duration, a start time, an end time, and remaining unused resources. The COT shared information may display remaining resources to avoid collisions. The terminal device C and the terminal device D that detect sidelink sharing may select an opportunity to join the COT sharing according to the information, and use the remaining unused resources to perform sidelink transmission. Further, the COT shared information may further indicate a duration of being allowed to be accessed by the terminal device C or the terminal device D that expects to join the COT sharing.

However, resources shared with another terminal device in the COT are limited. If a plurality of sidelinks want to join the COT sharing, the remaining resources in the COT may fail to meet needs of all sidelinks. Alternatively, if a plurality of terminal devices request to use a resource in a same time period based on a plurality of service types, a resource collision may occur. Further, if resources in the COT are allocated according to a request time, a service type with a higher priority may not be allocated with sufficient resources due to a relatively late request time, and data transmission cannot be completed in a timely manner. Therefore, how to manage and allocate resources used for sharing in a COT to improve resource utilization and reduce resource collisions is a technical problem that needs to be solved.

To solve some of the foregoing problems, an embodiment of the present application proposes a method for communication. In this method, resources used for sharing in a COT are managed in blocks based on a service type. Dynamic resource allocation is performed by using a service type corresponding to a requested resource, which helps improve resource utilization and further reduces a problem that some service types with a higher priority cannot be transmitted in a timely manner due to a lack of resources. The following describes the method for communication provided in an embodiment of the present application with reference to FIG. 5.

Referring to FIG. 5, in Step S510, a first terminal device determines, based on a service type for which a COT shared resource is requested by a second terminal device, a first resource allocated to the second terminal device in the COT shared resource.

The first terminal device may be a terminal device that initiates COT sharing. In some embodiments, the first terminal device may perform LBT on an unlicensed spectrum based on a transmission service, and obtain a COT resource after the LBT succeeds. The first terminal device may initiate COT sharing based on the COT resource. For example, the first terminal device may instruct, by sending COT-SI, another terminal device to perform sidelink communication by using a resource in the COT for sharing.

The second terminal device may be two terminals that perform sidelink communication with the first terminal device, or may be another terminal device that requests a resource in the COT. In some embodiments, the first terminal device and the second terminal device are two terminal devices that interact, for example, may be a vehicle and a pedestrian or two vehicles that communicate with each other in V2X. The first terminal device may be a transmitting terminal of a sidelink, and the second terminal device may be a receiving terminal. Alternatively, the first terminal device may be a receiving terminal of a sidelink, and the second terminal device may be a transmitting terminal. In some embodiments, the second terminal device may be a terminal device in a communication cluster in which the first terminal device is located. For example, both the first terminal device and the second terminal device may be cluster members in the communication cluster, or may respectively be a cluster header and a cluster member in the communication cluster. In some embodiments, the second terminal device may be a terminal device outside a communication cluster in which the first terminal device is located.

The first terminal device may perform unicast communication, groupcast communication, or broadcast communication with the second terminal device. When the first terminal device performs unicast communication, the second terminal device may be a receiving terminal. When the first terminal device performs groupcast communication, the second terminal device may be a receiving terminal in a communication cluster.

The COT shared resource may be an available resource in a COT resource pool for which sharing is initiated by the first terminal device, namely, a resource used for sharing in the COT described above. In some embodiments, the COT shared resource may refer to all resources in a COT, and a size of the COT shared resource is fixed. In some embodiments, the COT shared resource may refer to a remaining available resource in a COT, and a size of the COT shared resource is dynamically changed. In some embodiments, the COT shared resource may refer to a dynamically allocated resource pool in a COT.

The COT shared resource may be obtained by performing channel monitoring by the first terminal device on an unlicensed spectrum. For example, the first terminal device may initiate LBT. After the LBT succeeds, the COT shared resource is obtained. Generally, the first terminal device may determine, by means of energy detection, whether a channel is idle. The energy detection, for example, may refer to detecting reference signal received power (RSRP), or detecting a received signal strength indicator (RSSI).

The COT shared resource may have a specific priority. In some embodiments, a priority of the COT shared resource may be determined based on a priority corresponding to a service type for which COT sharing is initiated. The service type for which COT sharing is initiated refers to a service type for which the first terminal device requests a COT resource for transmission. For example, when the first terminal device requests the COT resource for performing real-time data transmission, an obtained COT shared resource may have a relatively high priority. In some embodiments, the priority of the COT shared resource may be determined based on a priority that the first terminal device initiates LBT.

The service type for which the COT shared resource is requested may be one of a plurality of service types supported by a system. In some embodiments, the plurality of service types may be different application scenarios based on the system. In some embodiments, the plurality of service types may be different service types determined based on a service priority, and the service type may also be a service priority. For example, the plurality of service types may be a plurality of types determined based on a related priority in quality of service (QoS).

In a possible implementation, the plurality of service types supported by the system may be three application scenarios in an NR communications system. For example, the plurality of service types may be enhanced mobile broadband (eMBB), ultra-reliable low-latency communication (uRLLC), and massive machine type communication (mMTC).

In another possible implementation, the plurality of service types may be determined based on a QoS class identifier (QCI). For example, the service types supported by the system may be classified into L types according to the QCI. The service type for which the COT shared resource is requested by the second terminal device may belong to one of the L service types. It should be noted that not all L service types can be allocated with the COT shared resource. In other words, the COT shared resource may support only some services in the L-type services. Details are described below.

Information that the second terminal device requests for the COT shared resource may be indicated by using a plurality of pieces of information. For example, a service type or a service priority for requesting the COT shared resource may be indicated by using higher layer RRC signaling. For another example, a size of a resource required for requesting the COT shared resource may be indicated by using SCI or other request information. In other words, the request information in the SCI may include a size of the requested resource.

The first resource may be a time-frequency resource allocated by the first terminal device to the second terminal device. As an initiator of COT sharing, the first terminal device may allocate the first resource to the second terminal device according to a specific scheduling policy. In some embodiments, the first terminal device may sort COT shared resources in a slot order, and schedule the COT shared resources in a slot order. In some embodiments, the first terminal device may allocate, in a same slot, frequency resources corresponding to different sub-channels.

The first resource may be indicated by using indication information related to the COT. In some embodiments, the first terminal device may directly indicate a time domain range and a frequency domain range of the first resource by using COT shared information. In some embodiments, the second terminal device may derive a start time and an end time and a frequency range of the first resource based on the indication information.

The first resource belongs to a first resource block in the COT shared resource. The first resource block may be one of a plurality of resource blocks in the COT shared resource. Shared resources in a COT may be managed in blocks for the plurality of resource blocks. Each resource block in the plurality of resource blocks may be considered as a resource allocation pool. The first terminal device may manage resources in the COT in blocks more finely, thereby reducing collisions of resource requests and improving resource utilization.

In some embodiments, the plurality of resource blocks in the COT shared resource may correspond to the plurality of service types described above. In other words, each type of service may be allocated with one resource block. When resources in a same time period are requested at different times for a plurality of types of services, the first terminal device may reduce a case in which resources are insufficient for a service type that has a relatively late request time. For example, when the COT shared resource supports K service types, the COT shared resource may include K resource blocks, and the K resource blocks are in a one-to-one correspondence with the K service types. In other words, in the COT shared resource, there are a plurality of resource allocation pools for a plurality of services.

In a possible implementation, when a service type corresponds to a service priority, resources shared in a COT may further be managed in blocks by using a plurality of service priorities. For example, the COT shared resource may support S different service priorities, and the COT shared resource may include S resource blocks that are in a one-to-one correspondence with the service priorities.

A size of each resource block in the plurality of resource blocks and an allocation unit may be determined based on the resources in the COT. In some embodiments, when the COT shared resource includes the foregoing $m \times n_{SubCH-size} \times T$ PRBs, the K resource blocks may be grouped in a unit of PRB. In some embodiments, the K resource blocks may further be grouped in a unit of resource element (RE) or physical resource block group (PRBG).

In some embodiments, after the COT shared resource is managed in blocks based on the service type, when it is determined that the first terminal device allocates a first resource to the second terminal device, the first terminal device needs to consider a service type corresponding to a resource block to which the first resource belongs. For example, when a service type for which a COT shared resource is requested by the second terminal device is real-time voice transmission, the first terminal device may use a corresponding resource in a resource block corresponding to the service as the first resource.

It may be learned from FIG. 5 that managing the COT shared resource in blocks based on the service type may facilitate the first terminal device to perform resource allocation more efficiently. However, as described above, the COT shared resource does not necessarily support all service types. In a case of COT sharing, a priority of data transmitted by a shared device cannot be lower than a priority of a shared COT. The priority of a shared COT is a priority of a COT shared resource. Therefore, a plurality of types of information need to be considered when a plurality of (for example, K) resource blocks in the COT shared resource are determined.

In some embodiments, the plurality of resource blocks may be determined based on a priority corresponding to a service type for which COT sharing is initiated. It may be learned from the foregoing that the priority of the service type for which a COT resource is shared cannot be lower than a priority corresponding to a service type for which COT sharing is initiated. Therefore, for the COT shared resource, the first terminal device may determine, based on a priority corresponding to a service type for which COT sharing is initiated, a quantity of service types for which the first resource may be allocated. For example, in the L service types determined based on the QCI, when a quantity of service types with a priority higher than or equal to a priority of a service type corresponding to the COT shared resource is K (K is less than or equal to L), the COT shared resource may be divided into K resource blocks. In other words, priorities respectively corresponding to the K service types are not lower than a priority corresponding to a service type for which COT sharing is initiated.

In a possible implementation, when a priority of the service type for which the COT shared resource is requested by the second terminal device is higher than the priority corresponding to the service type for which COT sharing is initiated, another condition further needs to be met to obtain the first resource, so as to improve resource transmission effect. In a possible implementation, when a sidelink corresponding to the second terminal device further meets a first condition, the first terminal device may allocate the first resource to the second terminal device. The first condition may be that channel quality corresponding to the sidelink is greater than a first threshold. For example, the channel quality is an RSRP at which a resource block i is expected to be shared for a sidelink communication service, and the first threshold may be $RSRP_{target}(i)$. Specifically, if $RSRP > RSRP_{target}(i)$, the service can be accessed and a resource can be allocated. In another possible implementation, $RSRPs_{target}$ corresponding to different service types may be the same, or may be different. When $RSRPs_{target}$ corresponding to different service types are different, the first threshold is related to the service type for which the COT shared resource is requested by the second terminal device.

In some embodiments, the plurality of resource blocks may be determined based on the priority corresponding to the service type for which COT sharing is initiated and a priority corresponding to a service type for which the COT shared resource is requested. For example, when priorities corresponding to K service types in service types for which COT shared resources are requested are higher than the priority corresponding to the service type for which COT is initiated, the COT shared resources may be divided into K resource blocks.

In some embodiments, the plurality of resource blocks may be determined based on the priority corresponding to the service type for which the COT shared resource is requested and a quantity of service types for which the COT shared resource is requested. For example, in the L service types for which COT shared resources are requested, when K service types have the highest priority, the COT shared resources may be divided into K resource blocks.

In some embodiments, the plurality of resource blocks may be determined based on a size of the COT shared resource and a size of a resource required for a service for which the COT shared resource is requested. For example, when a resource that may be used for allocation in the COT shared resources can only meet a size of resources required by K services, the COT shared resources may be divided into K resource blocks.

In some embodiments, the plurality of resource blocks may be determined depending on whether resources of each resource block are continuous. Continuous resources may be easily managed and scheduled, and discontinuous resources may help improve flexibility of resource use. In a possible implementation, whether resources of some resource blocks in the K resource blocks are continuous may be determined based on distribution of continuous resources in the COT shared resources. Resources of some resource blocks are discontinuous, so that resource utilization may be improved.

As mentioned above, the COT shared resource may be divided into K resource blocks, and the K resource blocks may be determined based on a size of the COT shared resource. After the size of the COT shared resource is determined, how to divide the COT shared resource into K resource blocks is a problem that needs to be considered.

In some embodiments, the size of each of the K resource blocks may be determined by evenly allocating COT shared resources. In other words, maximum resources allocated to all services are the same. A problem caused by insufficient resources of some service types may be solved by evenly allocating resources occupied by a COT, and resource use is monitored in real time. In a possible implementation, when the size of the COT shared resource is N PRBs in a time unit, a maximum resource allocated to each type of service in the K resource blocks is N/K PRBs. For example, even allocation is performed on all sub-channels in each slot. If N of each slot is $m \times n_{SubCHsize}$, a size of each resource block is $(m \times n_{SubCHsize})/K$.

In some embodiments, the size of each of the K resource blocks may be determined based on fairness factors corresponding to the K service types. After sizes of the plurality of resource blocks are determined based on the fairness factors, a sum of the sizes of the plurality of resource blocks should be less than or equal to a size of the COT shared resource. When the sum of the sizes of the plurality of resource blocks is equal to the size of the COT shared resource, it is more helpful to improve resource utilization. For example, when the COT shared resource is directly managed in blocks based on the fairness factors, a sum of the K fairness factors may be 1.

In a possible implementation, the fairness factor may be determined based on a service type and a service priority. In other words, a system allocates a fairness factor based on a service type and a service priority that are corresponding to a resource block. For example, a fairness factor of each of the K service types is represented by $Q_j$, where j is an integer ranging from 0 to K−1. In other words, a fairness factor corresponding to a resource block j in the K resource blocks that correspond to the K service types is $Q_j$.

In some embodiments, the size of each resource block may be determined based on a fairness factor on a basis of even allocation. In other words, the system may evenly divide the COT shared resource into K resource blocks based on supported K service types, and then determine, based on the allocated fairness factor, a size of a resource final allocated for each resource block. Therefore, a sum of the plurality of fairness factors is K, so as to ensure that a sum of the plurality of resource blocks is equal to the COT shared resource. In a possible example, a size of the COT shared resource is N PRBs in a time unit, and a size of the resource block j in the K resource blocks is $Q_j \times N/K$ PRBs in a time unit. The fairness factor $Q_j$ meets $\Sigma Q_j=K$, and j is an integer ranging from 0 to K−1. When the time unit is a slot, and N in each slot is $m \times n_{SubCHsize}$, a size of each resource block may be represented as $Q_j \times (m \times n_{SubCHsize})/K$ PRBs.

For the K resource blocks determined in different manners, resources of each resource block may be continuous, or may be discontinuous. In some embodiments, according to actual requirements of different service types, some of the evenly allocated K resource blocks may be continuous, and some of the resource blocks are discontinuous.

The foregoing describes how to divide the COT shared resource into a plurality of resource blocks. To use resources in each resource block more efficiently, the first terminal device may monitor use status of the resources in real time, so as to determine whether there is any remaining available resource for allocation. For example, the first terminal device may determine, based on an available resource of the first resource block, whether to allocate the first resource to the second terminal device.

In some embodiments, the available resource of the first resource block may be determined based on a size of the first resource block and a size of an allocated resource. The size of the first resource block may be determined based on the size of each resource block described above. For the size of an allocated resource, a size of a resource allocated each time needs to be considered, or a size of resource requested each time may be considered.

In a possible implementation, each time resource allocation is performed, an allocation unit may be determined based on a size of a requested resource or a setting manner of an RB in the COT shared resource. In other words, each time a resource is allocated, one allocation unit may be subtracted from each resource block. The allocation unit for each allocation may be RE, PRB, or PRBG. For example, when resource blocks in the COT shared resource are interleaved in rows, PRBG may be used as the allocation unit.

It is assumed that a frequency domain resource allocated each time on each resource block is represented as [index(i), index(i)+size(i)], where size(i) indicates a size of a resource requested by a terminal device i or for a service i by using SCI. Each time a resource is allocated, remaining available resources of resource blocks for different service types are a size of the resource block minus a sum of sizes of allocated resources. For example, the first resource block is the resource block j in the K resource blocks, S(j) denotes a size of an available resource of a resource block j, and S(j) meets the following condition:

$$S(j) = Q_j \times N/K - \sum_i \text{size}(i),$$

where N denotes a quantity of PRBs of the COT shared resource in a time unit; $Q_j$ denotes a fairness factor corresponding to a resource block j, $Q_j$ meets $\Sigma Q_j=K$, and j is an integer ranging from 0 to K−1; and size(i) denotes a size of a resource requested to be shared for a service i, and i is an integer greater than or equal to 0.

Based on the foregoing condition that S(j) meets, when the time unit is one slot, that is, when N in a single slot is $m \times n_{SubCHsize}$, S(j) meets the following condition:

$$S(j) = Q_j \times (m \times n_{SubCHsize})/K - \sum_i \text{size}(i),$$

where m denotes a quantity of sub-channels in a single slot, and $n_{SubCHsize}$ denotes a quantity of PRBs in each sub-channel.

In some embodiments, the first terminal device may monitor a resource use status in real time by determining S(j). For example, if S(j)>0, it indicates that there is a resource that may be allocated for the type of service; if S(j)≤0, it indicates that there is no resource available for this type of service. Each time a resource is allocated, sizes of S(j) may be compared to determine whether S(j) is greater than zero or less than or equal to zero.

In some embodiments, if after resources of a resource block corresponding to a service type are allocated, there is still a new service requesting to allocate the resources, the first terminal device may determine whether to invoke another resource block for the service. For example, when the first resource block does not have an available resource, the first terminal device may determine, based on an available resource of another resource block different from the first resource block in the K resource blocks, whether to allocate a resource in the another resource block to the second terminal device.

In a possible implementation, the first terminal device may determine, based on a service status, that another resource is not invoked, and the service may perform an LBT fallback mechanism to wait for allocation of a next slot resource.

In another possible implementation, the first terminal device may detect whether there is any remaining resource in a resource block corresponding to another service type. For example, when different resource blocks are allocated to K service types, as long as S(j) of another service resource block is greater than 0, a terminal device that executes a service may request remaining available resources in the another resource block. The first terminal device determines, based on available resources of another resource block other than the first resource block in the K resource blocks, whether to allocate a resource in the another resource block to the second terminal device.

The foregoing describes real-time monitoring and dynamic adjustment of resources in different resource blocks, which helps improve resource occupation. An index of a resource allocated next time may be further determined by means of real-time monitoring, and an available resource may be indicated to the second terminal device by using the resource index. The resource index may indicate a time-frequency location of the COT shared resource, or may indicate only a time-domain location or a frequency-domain location of the resource. For example, the first resource allocated by the first terminal device to the second terminal device may be indicated by using a resource index corresponding to the first resource.

In some embodiments, the resource index corresponding to the resource allocated next time may be related to a start index of the COT shared resource. The start index may be determined based on a start time-frequency location of a resource available for sharing in a COT, and may be represented by index0.

In some embodiments, the resource index corresponding to the resource allocated next time may be related to a size of K resource blocks. For example, when resources included in a resource block j in the K resource blocks are allocated next time, a start location of a time-frequency resource corresponding to the resource block j may be determined based on sizes of resource blocks numbered from 0 to j−1.

In some embodiments, the resource index corresponding to the resource allocated next time may be related to the size of the allocated resource. For example, in the resource block j, a time-frequency location of the resource allocated next time may be determined based on a start location of the resource block and a size of an allocated resource.

In some embodiments, the resource index corresponding to the resource allocated next time may be related to a start index of the COT shared resource, a size of the K resource blocks, and a size of the allocated resource. For example, the resource index index(j, i) corresponding to the resource allocated next time in a resource block j in the K resource blocks meets the following condition:

$$\text{index}(j, i) = \text{index0} + K_j \times Q_j \times \frac{N}{K} + \sum\nolimits_{j}^{i} \text{size}(j, i),$$

where N denotes a quantity of PRBs of the COT shared resource in a time unit; $Q_j$ denotes a fairness factor corresponding to a resource block j, $Q_j$ meets $\Sigma Q_j = K$, and j is an integer ranging from 0 to K−1; and size(j, i) denotes a size of a resource requested to be shared for a service i in the resource block j, and i is an integer greater than or equal to 0. $K_j$ denotes a resource pool j, a value of $K_j$ is an integer ranging from 0 to K−1, and index0 denotes a start index of the COT shared resource.

Based on the foregoing condition that index(j, i) meets, when the time unit is one slot, that is, when N in a single slot is $m \times n_{SubCHsize}$, index(j, i) meets the following condition:

$$\text{index}(j, i) = \text{index0} + K_j \times Q_j \times \frac{(m \times n_{SubCHsize})}{K} + \sum\nolimits_{j}^{i} \text{size}(j, i),$$

where m denotes a quantity of sub-channels in a single slot, and $n_{SubCHsize}$ denotes a quantity of PRBs in each sub-channel.

The foregoing describes a resource index corresponding to a resource, in the COT shared resource, used to perform next allocation. The resource may be used to transmit a PSSCH and a PSCCH, or may be used to transmit a PSFCH. Each terminal device that obtains a resource on the sidelink may feed back a PSFCH to an initiator of the COT sharing, and the feedback may indicate impact of a current resource on a communication result. The terminal device also sends a PSFCH feedback to a communicator on the sidelink, indicating a result of current communication.

In some embodiments, PSFCH resources may be apart of resources reserved in a COT resource pool. For example, the PSFCH resources may be reserved in a unit of N slots (N=1, 2, or 4). In some embodiments, the PSFCH resources may be divided into several common resource blocks according to a service. For example, the COT shared resource may schedule one or more resource blocks for transmitting the PSFCH.

As mentioned above, in some communications systems, groupcast and unicast in sidelink may support a HARQ mechanism. When a HARQ setting is enabled, a terminal device that receives the PSFCH determines, based on a feedback status, whether to initiate retransmission. Generally, when feedback information carried in the PSFCH is NACK, the terminal device that receives the PSFCH retransmits data corresponding to the NACK, so as to ensure data transmission reliability.

However, resources used for sharing in a COT are limited. If NACK for a service is retransmitted continuously, resource waste may be caused. For example, in a case in which a link environment is poor, a receiving terminal continuously feeds back the NACK, and thus a transmitting terminal continuously requests COT shared resources for data retransmission. Consequently, no resource is available for a resource block corresponding to the service, and no resource is available for another resource block, which affects transmission of another service.

For unicast communication, the transmitting terminal may determine, based on a quantity of NACK feedback times and an available resource of a corresponding service in the COT shared resource block, whether to request the foregoing first resource for retransmission. The terminal device that initiates COT sharing may also determine, according to above description, whether to allocate the first resource.

For groupcast communication, the terminal device that initiates a groupcast service may set HARQ enabling and HARQ disabling depending on a service mode. The groupcast service may include two service modes: A first mode is a groupcast service initiated by a terminal device that initiates COT sharing; and a second mode is a groupcast service initiated by a terminal device that occupies a COT shared resource. Because terminal devices that initiate a groupcast service are different, different retransmission policies may be set depending on different service modes, so as to meet communication requirements of the terminal devices that initiate COT sharing. In other words, a groupcast service in the first mode may have a higher priority than a groupcast service in the second mode. How to ensure a main communication requirement of groupcast communication based on the foregoing analysis is a problem to be considered.

An embodiment of the present application further provides a method for communication. In the method, COT shared information is used to indicate whether a terminal device may perform retransmission by using a first resource, and resource utilization is improved by limiting a specific application of a COT shared resource. The following specifically describes the method with reference to FIG. 6.

Referring to FIG. 6, in step S610, a first terminal device sends first COT shared information, where the first COT shared information indicates that the first terminal device has allocated the first resource in a COT to a second terminal device.

The first terminal device is the first terminal device shown in FIG. 5, and details are not described herein again. The second terminal device may be a terminal device that initiates a groupcast service. It should be noted that the second terminal device in FIG. 6 may be a terminal device that initiates COT resource sharing, or may be a terminal device that occupies a COT shared resource.

The first COT shared information may be carried in a PSSCH or PSCCH, which is not limited herein.

That the first terminal device has allocated the first resource in a COT to a second terminal device may refer to that the first terminal device allocates a resource to a terminal device in a cluster, or may refer to that the first terminal device allocates a remaining available resource in a COT to a terminal device outside the cluster.

The first resource may be a reserved resource in the COT, or may be a resource in resource blocks corresponding to different service types shown in FIG. 5.

First information is used to indicate whether the first resource is used by the second terminal device for retransmission, which means that the first information may indicate that the second terminal device initiates intra-cluster retransmission by using the first resource, or may indicate that the second terminal device does not perform retransmission by using the first resource.

The first information may be determined based on one or more types of information. The more types of information are, for example, whether the second terminal device is a terminal device that initiates COT sharing, for another example, a terminal device that feeds back NACK to the second terminal device, for yet another example, whether HARQ feedback is disabled on a sidelink channel sent by the second terminal device.

In some embodiments, the first information may be determined depending on whether the second terminal device is the terminal device that initiates COT sharing. For example, when the second terminal device is the terminal device that initiates COT sharing, the first information may indicate that the second terminal device initiates intra-cluster retransmission upon receiving NACK feedback. For another example, when the second terminal device is not the terminal device that initiates the COT sharing, the first information may indicate that the second terminal device does not initiate intra-cluster retransmission in a case of receiving NACK feedback.

In some embodiments, the first information may be determined based on a terminal device that feeds back NACK to the second terminal device. In other word, the first information may be determined based on a status that the second terminal device receives the NACK feedback. The terminal device that feeds back NACK may refer to a quantity of terminal devices, or may refer to a status of a communication cluster in which the terminal device that feeds back NACK is located. For example, in groupcast communication initiated by the second terminal device, when there is a relatively large quantity of terminal devices that feed back NACK, the first information may instruct the second terminal device to initiate intra-cluster retransmission by using the first resource. For another example, when the plurality of terminal devices that feed back NACK and the terminal device that initiates the COT sharing are in a same communication cluster, the first information may instruct the second terminal device to initiate retransmission.

In some embodiments, the first information may be determined depending on whether HARQ feedback is disabled on the sidelink channel sent by the second terminal device. If HARQ feedback is disabled, resources for transmitting PSFCH may be reduced, or resources related to retransmission may be reduced. The sidelink channel sent by the second terminal device may be a plurality of channels sent to members in a cluster, which is not limited herein. For example, when HARQ feedback is disabled when a PSSCH is sent by the second terminal device, the second terminal device does not perform retransmission, and the first information may directly indicate that the first resource is not used for retransmission. For another example, when HARQ feedback is disabled when the PSSCH is sent by the second terminal device, the first information may directly indicate that the second terminal device performs retransmission only twice.

In some embodiments, the first information may be determined based on the foregoing plurality of types of information. For example, if the second terminal device is the terminal device that initiates the COT sharing, when a quantity of terminal devices that feed back NACK to the second terminal device is at least one, the first information indicates that the second terminal device performs retransmission by using the first resource. For another example, if the second terminal device is not the terminal device that initiates the COT sharing, when a quantity of terminal devices that feed back NACK to the second terminal device meets a second condition, the first information indicates that the second terminal device performs retransmission by using the first resource; otherwise, retransmission is not performed.

In a possible implementation, the second condition may be related to the quantity of terminal devices that feed back NACK, or may be related to a quantity of terminal devices that receive data in a communication cluster. The quantity of terminal devices that receive data corresponding to NACK feedback may be represented by using a first parameter. For example, the second condition is that when a ratio of the quantity of terminal devices that feed back the NACK to the second terminal device to the first parameter is greater than a second threshold, the first information instructs the second terminal device to perform retransmission. The second threshold is, for example, 30% or 50%.

In a possible implementation, when the second terminal device is not the terminal device that initiates the COT sharing, whether HARQ feedback is disabled on a sidelink channel sent by the second terminal device may be determined based on a service type carried in the sidelink channel. The service type carried in the sidelink channel may be one of the foregoing K service types for which COT resources are shared. For example, whether HARQ feedback is disabled may be determined based on a priority of a service type carried in the sidelink channel. When the priority of the service type carried in the sidelink channel is relatively high, HARQ feedback is not disabled, so that transmission reliability may be ensured.

Figure 8:
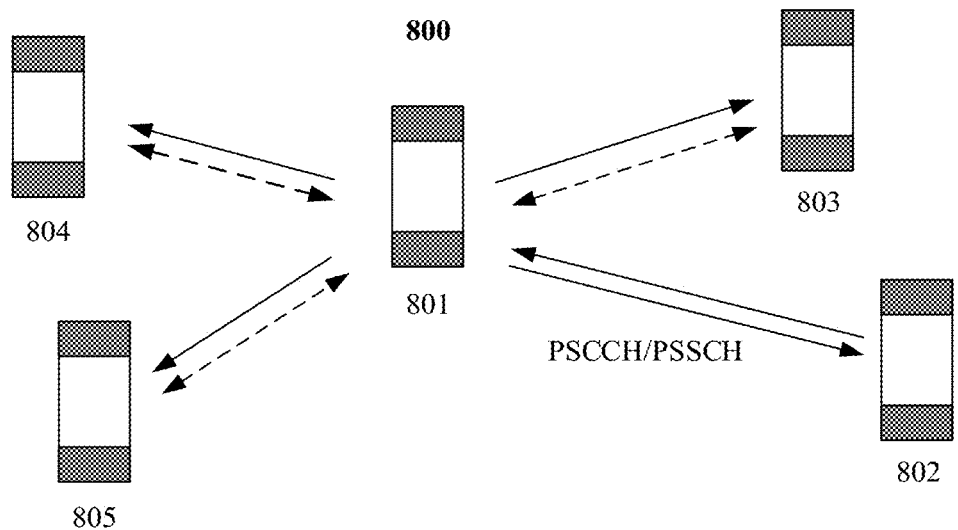
FIG. 8 is an example diagram of a groupcast communications system to which embodiments of the present application are applicable.
Figure 9:
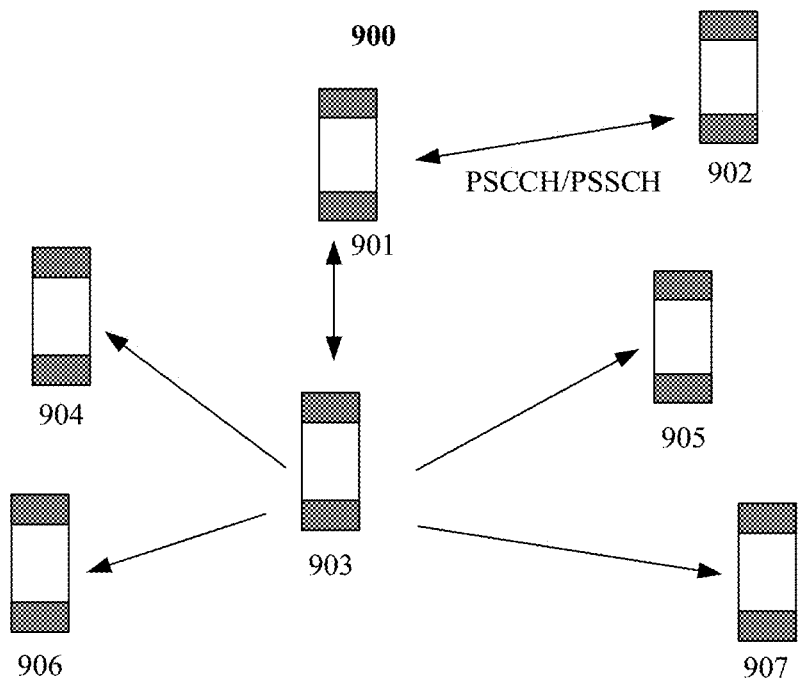
FIG. 9 is an example diagram of another groupcast communications system to which embodiments of the present application are applicable.

For ease of understanding, the following uses a unicast communications system and a groupcast communications system to which embodiments of the present application are applicable as examples for detailed description with reference to FIG. 7 to FIG. 9. FIG. 7 is an example diagram of a unicast communications system to which embodiments of the present application are applicable. FIG. 8 is an example diagram of a groupcast communications system to which embodiments of the present application are applicable. FIG. 9 is an example diagram of another groupcast communications system to which embodiments of the present application are applicable.

Referring to FIG. 7, a unicast communications system 700 includes terminal devices 701 to 704. After accessing a network through LBT, the terminal device 701 may initiate COT sharing. The terminal device 701 transmits a PSCCH and a PSSCH to the terminal device 702 by means of unicast communication.

The terminal device 702 is an intra-cluster terminal device that communicates with the terminal device 701 on a sidelink. The terminal device 702 obtains transmission and scheduling information SCI related to the sidelink by demodulating the PSCCH. The SCI may help the terminal device 702 to receive and decode sidelink information. The terminal device 702 may send the PSFCH to the terminal device 701 by using a COT shared resource. Generally, as long as the terminal device 702 feeds back NACK, the terminal device 701 initiates retransmission by using the COT shared resource.

The terminal device 703 and the terminal device 704 are out-cluster terminal devices that expect to perform sidelink communication through COT sharing of the terminal device 701. The terminal device 703 and the terminal device 704 may join the COT sharing of terminal device 701 by detecting COT shared information. Both the terminal device 703 and the terminal device 704 may send the PSFCH to the terminal device 701 by using the COT shared resource. If a quantity of transmissions of NACK fed back by the terminal device 703 or the terminal device 704 to the terminal device 701 reaches a specific value (for example, three or five times), and no resource is available in a resource block to which a service corresponding to the NACK belongs, the terminal device 703 or the terminal device 704 can no longer request retransmission resource allocation in another service resource block.

Referring to FIG. 8, a groupcast communications system 800 includes terminal devices 801 to 805. The terminal device 801 communicates with its cluster member terminal devices 802 to 805 in a groupcast mode.

The terminal device 801 is an initiating terminal of COT sharing. The cluster members, terminal devices 802 to 805, may receive information from the terminal device 801. The terminal devices 802 to 805 obtain a start point, an end point, a duration, and the like of a COT shared resource by demodulating PSCCH/PSSCH. In other words, the terminal device 801 that initiates COT resource sharing is also an initiator of a groupcast service.

If HARQ of a communications group in which the terminal device 801 is located is set to an enabled state, the terminal devices 802 to 805 send a NACK indication when decoding of the PSSCH/PSCCH fails. The terminal device 801 may have the following two processing modes.

Mode 1: The terminal device 801 initiates intra-cluster retransmission upon receiving NACK fed back by one intra-cluster terminal.

Mode 2: The terminal device 801 initiates intra-cluster retransmission only when a ratio of a quantity of transmissions of NACK fed back by the intra-cluster terminal to a quantity of groupcast terminals reaches a specific proportion, for example, 30%, or 50%; otherwise, the terminal device 801 does not initiate retransmission.

Referring to FIG. 9, a groupcast communications system 900 includes terminal devices 901 to 907. The terminal device 901 communicates with the terminal device 902 and the terminal device 903 in a groupcast mode, and the terminal device 903 also communicates with its cluster members terminal devices 904 to 907 in a groupcast mode.

The terminal device 901 is an initiating terminal of COT sharing. The cluster members, terminal device 902 and the terminal device 903, may receive information from the terminal device 901. The terminal device 902 and the terminal device 903 obtain a start point, an end point, a duration, and the like of COT sharing by demodulating PSCCH/PSSCH.

The terminal device 903 may initiate groupcast communication by using a COT shared resource initiated by the terminal device 901, and communicate with cluster members terminal devices 904 to 907. If a groupcast service initiated by the terminal device 903 enables HARQ, the terminal devices 904 to 907 feed back the HARQ to the terminal device 903 according to a decoding status. Because the terminal device 903 that initiates the groupcast service is not an initiator of COT sharing, the terminal device 903 initiates intra-cluster retransmission only when a ratio of a quantity of transmissions of NACK fed back by an intra-cluster terminal to a quantity of groupcast terminals reaches a specific ratio. This proportion may also be 30%, 50%, or the like. Otherwise, the terminal device 903 does not initiate retransmission.

To save resources, HARQ feedback may also be disabled for the groupcast service initiated by the terminal device 903. In other words, the terminal devices 904 to 907 may not consider a decoding case, and do not send feedback to the terminal device 903. The terminal device 903 may not perform retransmission, or may perform a fixed quantity of retransmissions.

The method embodiments of the present application are described in detail above with reference to FIG. 1 to FIG. 9. The apparatus embodiments of the present application are described in detail below with reference to FIG. 10 and FIG. 11. It should be understood that the description of the apparatus embodiments corresponds to the description of the method embodiments, and therefore, for parts that are not described in detail, reference may be made to the foregoing method embodiments.

Figure 10:
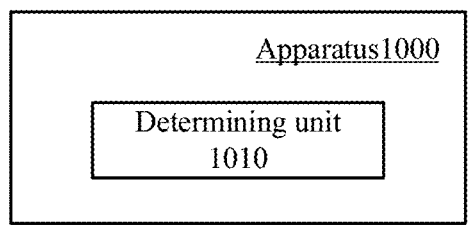
FIG. 10 is a schematic structural diagram of an apparatus for communication according to an embodiment of the present application.

FIG. 10 is a schematic structural diagram of an apparatus for communication according to an embodiment of the present application. The apparatus 1000 for communication is configured as any one of the foregoing first terminal devices, and may perform the foregoing method for communication in FIG. 5. As shown in FIG. 10, the apparatus 1000 includes a determining unit 1010.

The determining unit 1010 is configured to determine, based on a service type for which a COT shared resource is requested by a second terminal device, a first resource allocated to the second terminal device in the COT shared resource, where the first resource belongs to a first resource block, the first resource block is one of K resource blocks in the COT shared resource, and the K resource blocks are in a one-to-one correspondence with K service types.

Optionally, the K resource blocks are determined based on one or more of the following information: a priority corresponding to a service type for which COT sharing is initiated; a priority corresponding to a service type for which the COT shared resource is requested; a quantity of service types for which the COT shared resource is requested; a size of the COT shared resource; a size of a resource required for a service for which the COT shared resource is requested; and whether resources of each resource block in the K resource blocks are continuous.

Optionally, priorities respectively corresponding to the K service types are not lower than the priority corresponding to a service type for which COT sharing is initiated.

Optionally, a size of each resource block in K resource blocks is determined by evenly allocating COT shared resources.

Optionally, a size of each resource block in the K resource blocks is determined based on fairness factors corresponding to the K service types.

Optionally, the size of the COT shared resource is N PRBs in a time unit, a fairness factor corresponding to a resource block j in the K resource blocks is $Q_j$, and $Q_j$ meets $\Sigma Q_j = K$, where j is an integer ranging from 0 to K−1, and a size of the resource block j is $Q_j \times N/K$ PRBs in a time unit.

Optionally, the apparatus 1000 further includes an allocation unit, which may be configured to: when sidelink corresponding to the second terminal device meets a first condition, allocate the first resource to the second terminal device.

Optionally, the first condition is that channel quality corresponding to the sidelink is greater than a first threshold, and the first threshold is related to the service type for which the COT shared resource is requested by the second terminal device.

Optionally, the determining unit 1010 is further configured to determine, based on an available resource of the first resource block, whether to allocate the first resource to the second terminal device.

Optionally, the available resource of the first resource block is determined based on a size of the first resource block and a size of an allocated resource.

Optionally, the size of the COT shared resource is N PRBs in a time unit, the first resource block is a resource block j in the K resource blocks, a fairness factor corresponding to the resource block j is $Q_j$, and $Q_j$ meets $\Sigma Q_j = K$, where j is an integer ranging from 0 to K−1, and a size S(j) of an available resource of the resource block j meets the following condition:

$$S(j) = Q_j \times N/K - \sum_i \text{size}(i),$$

where size(i) denotes a size of a shared resource requested for a service i, and i is an integer greater than or equal to 0.

Optionally, the first resource block has no available resource, and the determining unit 1010 is further configured to determine, based on an available resource of another resource block different from the first resource block in the K resource blocks, whether to allocate a resource in the another resource block to the second terminal device.

Optionally, the first resource is indicated by using a resource index corresponding to the first resource.

Optionally, the resource index corresponding to the first resource is related to one or more of the following information: a start index of the COT shared resource, a size of the K resource blocks, and a size of an allocated resource.

Optionally, the size of the COT shared resource is N PRBs in a time unit, a fairness factor corresponding to a resource block j in the K resource blocks is $Q_j$, $Q_j$ meets $\Sigma Q_j = K$, where j is an integer ranging from 0 to K−1, the first resource belongs to the resource block j, and a resource index index(j, i) corresponding to the first resource meets the following condition:

$$\text{index}(j, i) = \text{index}0 + K_j \times Q_j \times \frac{N}{K} + \sum_j^i \text{size}(j, i),$$

where size(j, i) denotes a size of a shared resource requested for a service i in the resource block j, i is an integer greater than or equal to 0, $K_j$ denotes a resource pool j, a value of $K_j$ is an integer ranging from 0 to K−1, and index0 denotes a start index of the COT shared resource.

Optionally, the apparatus 1000 further includes a sending unit, configured to send first COT shared information, the first COT shared information indicates that the first terminal device has allocated the first resource in a COT to the second terminal device. The first COT shared information includes first information, and the first information is used to indicate whether the first resource is used by the second terminal device for retransmission.

Optionally, the first information is determined based on the following information: whether the second terminal device is a terminal device that initiates sharing of the COT; a terminal device that feeds back NACK to the second terminal device; and whether HARQ feedback is disabled on a sidelink channel sent by the second terminal device.

Optionally, the first information is determined based on the following information: if the second terminal device is the terminal device that initiates sharing of the COT, when a quantity of terminal devices that feed back NACK to the second terminal device is at least one, the first information indicates that the second terminal device performs retransmission by using the first resource; if the second terminal device is not the terminal device that initiates sharing of the COT, when a quantity of terminal devices that feed back NACK to the second terminal device meets a second condition, the first information indicates that the second terminal device performs retransmission by using the first resource.

Optionally, the second condition is that a ratio of the quantity of terminal devices that feed back NACK to the second terminal device to a first parameter is greater than a second threshold, and the first parameter is a quantity of terminal devices that receive data corresponding to the NACK.

Optionally, the second terminal device is not the terminal device that initiates sharing of the COT, and whether HARQ feedback is disabled on a sidelink channel sent by the second terminal device is determined based on a service type carried in the sidelink channel.

Figure 11:
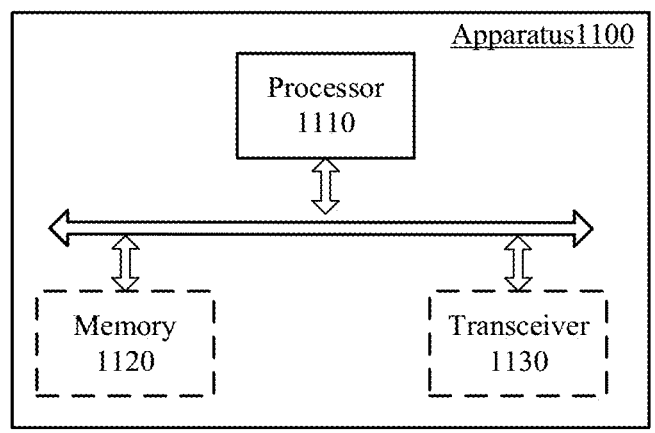
FIG. 11 is a schematic structural diagram of a communications apparatus according to an embodiment of the present application.

FIG. 11 is a schematic structural diagram of a communications apparatus according to an embodiment of the present application. The dashed lines in FIG. 11 indicate that the unit or module is optional. The apparatus 1100 in FIG. 11 may be configured to implement the methods described in the foregoing method embodiments. The apparatus 1100 may be a chip, a terminal device, or a network device.

The apparatus 1100 may include one or more processors 1110. The processor 1110 may allow the apparatus 1100 to implement the methods described in the foregoing method embodiments. The processor 1110 may be a general-purpose processor or a dedicated processor. For example, the processor may be a central processing unit (CPU). Alternatively, the processor may be another general-purpose processor, a digital signal processor (DSP), an application-specific integrated circuit (ASIC), a field-programmable gate array (FPGA) or another programmable logic device, a discrete gate or transistor logic device, a discrete hardware component, or the like. The general-purpose processor may be a microprocessor, or the processor may be any conventional processor or the like.

The apparatus 1100 may further include one or more memories 1120. The memory 1120 stores a program that may be executed by the processor 1110 to cause the processor 1110 to perform the methods described in the foregoing method embodiments. The memory 1120 may be independent of the processor 1110 or may be integrated into the processor 1110.

The apparatus 1100 may further include a transceiver 1130. The processor 1110 may communicate with another device or chip through the transceiver 1130. For example, the processor 1110 may send and receive data to and from another device or chip through the transceiver 1130.

An embodiment of the present application further provides a computer-readable storage medium for storing a program. The computer-readable storage medium may be applied to the terminal device or the network device provided in the embodiments of the present application, and the program causes a computer to perform the methods to be performed by the terminal device or the network device in various embodiments of the present application.

The computer-readable storage medium may be any usable medium readable by the computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive (SSD)), or the like.

An embodiment of the present application further provides a computer program product. The computer program product includes a program. The computer program product may be applied to the terminal device or the network device provided in the embodiments of the present application, and the program causes a computer to perform the methods to be performed by the terminal device or the network device in various embodiments of the present application.

All or some of the foregoing embodiments may be implemented by using software, hardware, firmware, or any combination thereof. When software is used to implement embodiments, the foregoing embodiments may be implemented completely or partially in a form of a computer program product. The computer program product includes one or more computer instructions. When the computer program instructions are loaded and executed on a computer, the procedures or functions according to the embodiments of the present application are completely or partially generated. The computer may be a general-purpose computer, a dedicated computer, a computer network, or another programmable apparatus. The computer instructions may be stored in a computer-readable storage medium or transmitted from one computer-readable storage medium to another computer-readable storage medium. For example, the computer instructions may be transmitted from a website, computer, server, or data center to another website, computer, server, or data center in a wired (such as a coaxial cable, an optical fiber, and a digital subscriber line (DSL)) manner or a wireless (such as infrared, wireless, and microwave) manner.

The terms "system" and "network" in the present application may be used interchangeably. In addition, the terms used in the present application are only used to explain the specific embodiments of the present application, and are not intended to limit the present application. The terms "first", "second", "third", "fourth", and the like in the specification, claims, and drawings of the present application are used to distinguish between different objects, rather than to describe a specific order. In addition, the terms "include" and "have" and any variations thereof are intended to cover a non-exclusive inclusion.

In the embodiments of the present application, "indicate" mentioned herein may refer to a direct indication, or may refer to an indirect indication, or may mean that there is an association relationship. For example, A indicates B, which may mean that A directly indicates B, for example, B may be obtained by means of A; or may mean that A indirectly indicates B, for example, A indicates C, and B may be obtained by means of C; or may mean that there is an association relationship between A and B.

In the embodiments of the present application, the term "corresponding" may mean that there is a direct or indirect correspondence between the two, or may mean that there is an association relationship between the two, which may also be a relationship such as indicating and being indicated, or configuring and being configured.

In the embodiments of the present application, "pre-defined" or "pre-configured" may be implemented by pre-storing corresponding codes, tables, or other forms that can be used to indicate related information in devices (for example, including the terminal device and the network device), and a specific implementation thereof is not limited in the present application. For example, pre-defined may refer to defined in the protocol.

In the embodiments of the present application, determining B based on A does not mean determining B based only on A, but instead B may be determined based on A and/or other information.

In the embodiments of the present application, the term "and/or" is merely an association relationship that describes associated objects, and represents that there may be three relationships. For example, A and/or B may represent three cases: only A exists, both A and B exist, and only B exists. In addition, the character "/" herein generally indicates an "or" relationship between the associated objects.

In the embodiments of the present application, sequence numbers of the foregoing processes do not mean execution sequences. The execution sequences of the processes should be determined according to functions and internal logic of the processes, and should not be construed as any limitation on the implementation processes of the embodiments of the present application.

In several embodiments provided in the present application, it should be understood that, the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatus or units may be implemented in electronic, mechanical, or other forms.

The units described as separate components may be or may not be physically separated, and the components displayed as units may be or may not be physical units, that is, may be located in one place or distributed on a plurality of network units. Some or all of the units may be selected according to actual needs to achieve the objective of the solutions of the embodiments.

In addition, function units in the embodiments of the present application may be integrated into one processing unit, or each of the units may exist alone physically, or two or more units may be integrated into one unit.

The foregoing descriptions are merely specific implementations of the present application, but the protection scope of the present application is not limited thereto. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A method for communication, comprising:
receiving, by a first terminal device from a second terminal device, a request for allocating resources in a channel occupancy time (COT) shared resource;
determining, by the first terminal device based on a priority corresponding to a service type for which COT sharing is initiated and a fairness factor of the COT shared resource, a first resource allocated to the second terminal device in the COT shared resource, wherein a priority corresponding to service types associated with the second terminal device is not lower than the priority corresponding to the service type for which COT sharing is initiated, and
wherein the first resource is in the COT shared resource, each resource block in the COT shared resource corresponds to a priority associated with a service type, and the fairness factor is assigned to a resource block corresponding to the priority associated with the service type.

2. The method according to claim 1, wherein resource blocks in the COT shared resource are determined based on one or more of the following information:
a size of the COT shared resource; or
whether resources of each resource block in the resource blocks are continuous.

3. The method according to claim 1, wherein a size of each resource block in the COT shared resource is the same.

4. The method according to claim 1, wherein a size of each of K resource blocks in the COT shared resource is determined based on fairness factors corresponding to the K resource blocks.

5. The method according to claim 4, wherein a size of the COT shared resource is N physical resource blocks (PRBs) in a time unit, a fairness factor corresponding to a resource block j in the K resource blocks is $Q_j$, and $Q_j$ meets $\Sigma Q_j = K$, wherein j is an integer ranging from 0 to K−1, and a size of the resource block j is $Q_j \times N/K$ PRBs in a time unit.

6. The method according to claim 1, wherein the determining the first resource allocated to the second terminal device further comprises:
determining that sidelink corresponding to the second terminal device meets a first condition.

7. The method according to claim 6, wherein the first condition is that channel quality corresponding to the sidelink is greater than a first threshold, and the first threshold is related to the service type.

8. The method according to claim 1, wherein the method further comprises:
determining, by the first terminal device based on an available resource of a first resource block, whether to allocate the first resource to the second terminal device.

9. The method according to claim 1, wherein a size of the COT shared resource is N PRBs in a time unit, the first resource block is a resource block j in K resource blocks in the COT shared resource, a fairness factor corresponding to the resource block j is $Q_j$, and $Q_j$ meets $\Sigma Q_j = K$, wherein j is an integer ranging from 0 to K−1, and a size $S(j)$ of an available resource of the resource block j meets the following condition:

$$S(j) = Q_j \times N/K - \sum_i \text{size}(i),$$

wherein size(i) denotes a size of a shared resource requested for a service i, and i is an integer greater than or equal to 0.

10. The method according to claim 1, wherein the first resource is indicated by using a resource index corresponding to the first resource.

11. The method according to claim 10, wherein the resource index is determined based on one or more of the following information: a start index of the COT shared resource and a size of resource blocks in the COT shared resource.

12. The method according to claim 11, wherein a size of the COT shared resource is N PRBs in a time unit, a fairness factor corresponding to a resource block j in K resource blocks in the COT shared resource is $Q_j$, $Q_j$ meets $\Sigma Q_j = K$, wherein j is an integer ranging from 0 to K−1, the first resource belongs to the resource block j, and a resource index index(j, i) corresponding to the first resource meets the following condition:

$$\text{index}(j, i) = \text{index}0 + K_j \times Q_j \times \frac{N}{K} + \sum_j^i \text{size}(j, i),$$

wherein size(j, i) denotes a size of a shared resource requested for a service i in the resource block j, i is an integer greater than or equal to 0, $K_j$ denotes a resource pool j, a value of $K_j$ is an integer ranging from 0 to K−1, and index0 denotes a start index of the COT shared resource.

13. The method according to claim 1, wherein the method further comprises:
sending, by the first terminal device, first COT shared information, wherein the first COT shared information indicates the first resource,
wherein the first COT shared information indicates whether the first resource is used by the second terminal device for retransmission.

14. The method according to claim 13, wherein the first resource is used for retransmission is determined based on one or more of the following information:
whether the second terminal device receives negative acknowledgement (NACK); or
whether hybrid automatic repeat request (HARQ) feedback is disabled on a sidelink channel sent by the second terminal device.

15. A first terminal device, comprising:
at least one processor;
one or more non-transitory computer-readable storage media coupled to the at least one processor and storing programming instructions for execution by the at least one processor, wherein the programming instructions, when executed, cause the first terminal device to perform operations comprising:
receiving, from a second terminal device, a request for allocating resources in a channel occupancy time (COT) shared resource;
determining, based on a priority corresponding to a service type for which COT sharing is initiated and a fairness factor of the COT shared resource, a first resource allocated to the second terminal device in the COT shared resource, wherein a priority corresponding to service types associated with the second terminal device is not lower than the priority corresponding to the service type for which COT sharing is initiated; and
wherein the first resource is in the COT shared resource, each resource block in the COT shared resource corresponds to a priority associated with a service type, and the fairness factor is assigned to a resource block corresponding to the priority associated with the service type.

16. The first terminal device according to claim 15, wherein resource blocks in the COT shared resource are determined based on one or more of the following information:
a size of the COT shared resource; or
whether resources of each resource block in the resource blocks are continuous.

17. The first terminal device according to claim 15, wherein a size of each resource block in the COT shared resource is the same.

18. The first terminal device according to claim 15, wherein a size of each of K resource blocks in the COT shared resource is determined based on fairness factors corresponding to the K resource blocks.

19. The first terminal device according to claim 18, wherein a size of the COT shared resource is N physical resource blocks (PRBs) in a time unit, a fairness factor corresponding to a resource block j in the K resource blocks is $Q_j$, and $Q_j$ meets $\Sigma Q_j = K$, wherein j is an integer ranging from 0 to K−1, and a size of the resource block j is $Q_j \times N/K$ PRBs in a time unit.

20. A chip, comprising:
at least one processor configured to execute instructions to:
receive, from a second terminal device, a request for allocating resources in a channel occupancy time (COT) shared resource;
determining, based on a priority corresponding to a service type for which COT sharing is initiated and a fairness factor of the COT shared resource, a first resource allocated to the second terminal device in the COT shared resource, wherein a priority corresponding to service types associated with the second terminal device is not lower than the priority corresponding to the service type for which COT sharing is initiated, and
wherein the first resource is in the COT shared resource, each resource block in the COT shared resource corresponds to a priority associated with a service type, and the fairness factor is assigned to a resource block corresponding to the priority associated with the service type.

* * * * *